Nov. 15, 1966  R. E. SCHNEIDER ETAL  3,285,162
BACON PRESSING

Filed March 2, 1965  7 Sheets-Sheet 1

Inventors
RONALD E. SCHNEIDER
OGDEN A. CLEMENS
By McCabe
Attorney

Inventors
RONALD E. SCHNEIDER
OGDEN A. CLEMENS
By [signature] McCabe
Attorney

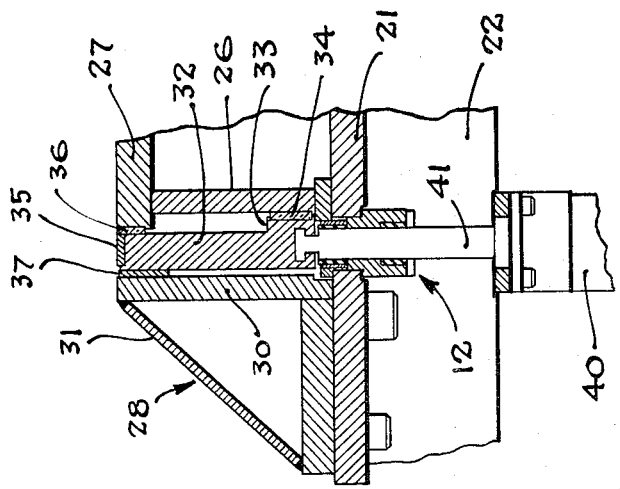
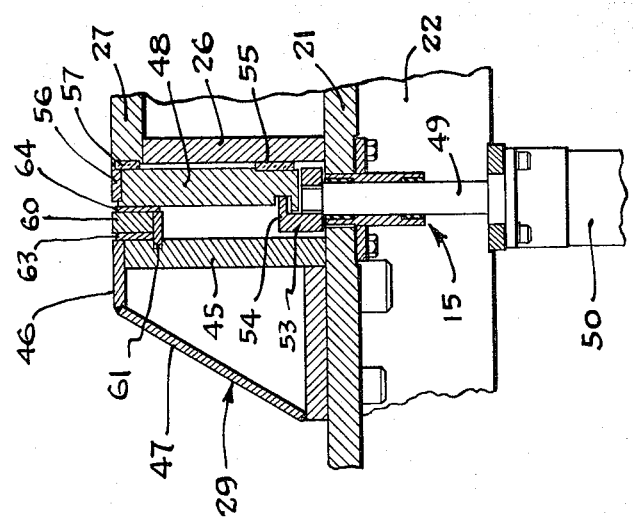

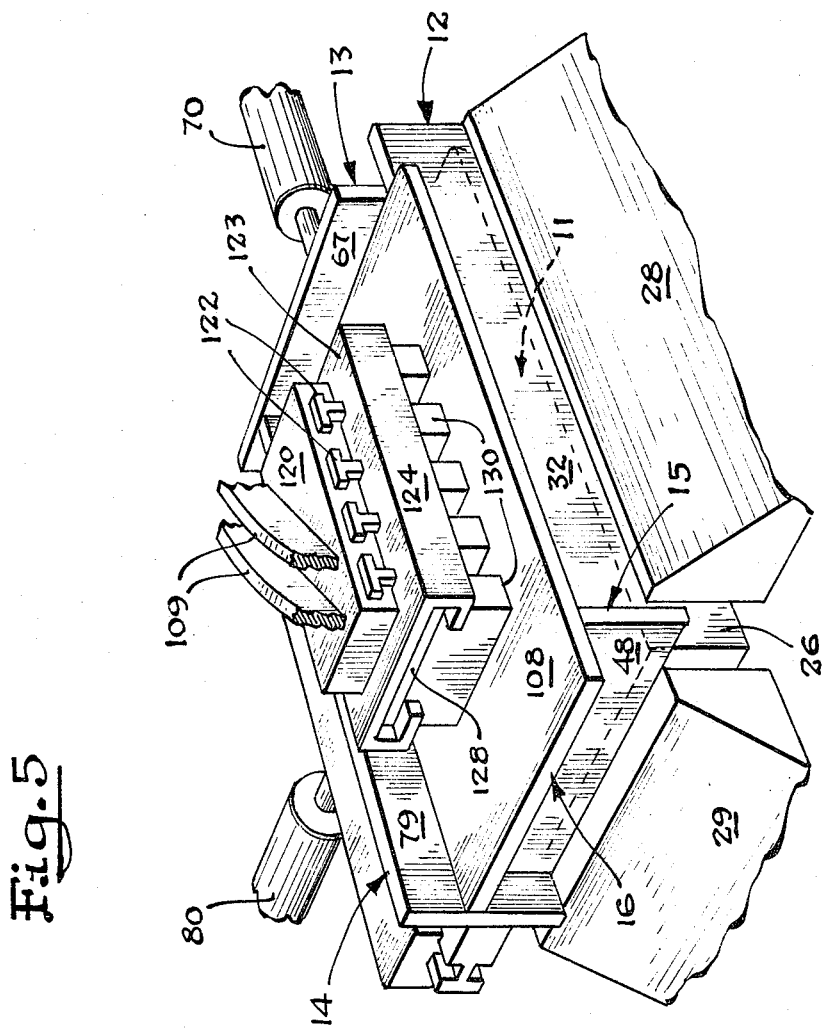

Inventors
RONALD E. SCHNEIDER
OGDEN A. CLEMENS
By
Attorney

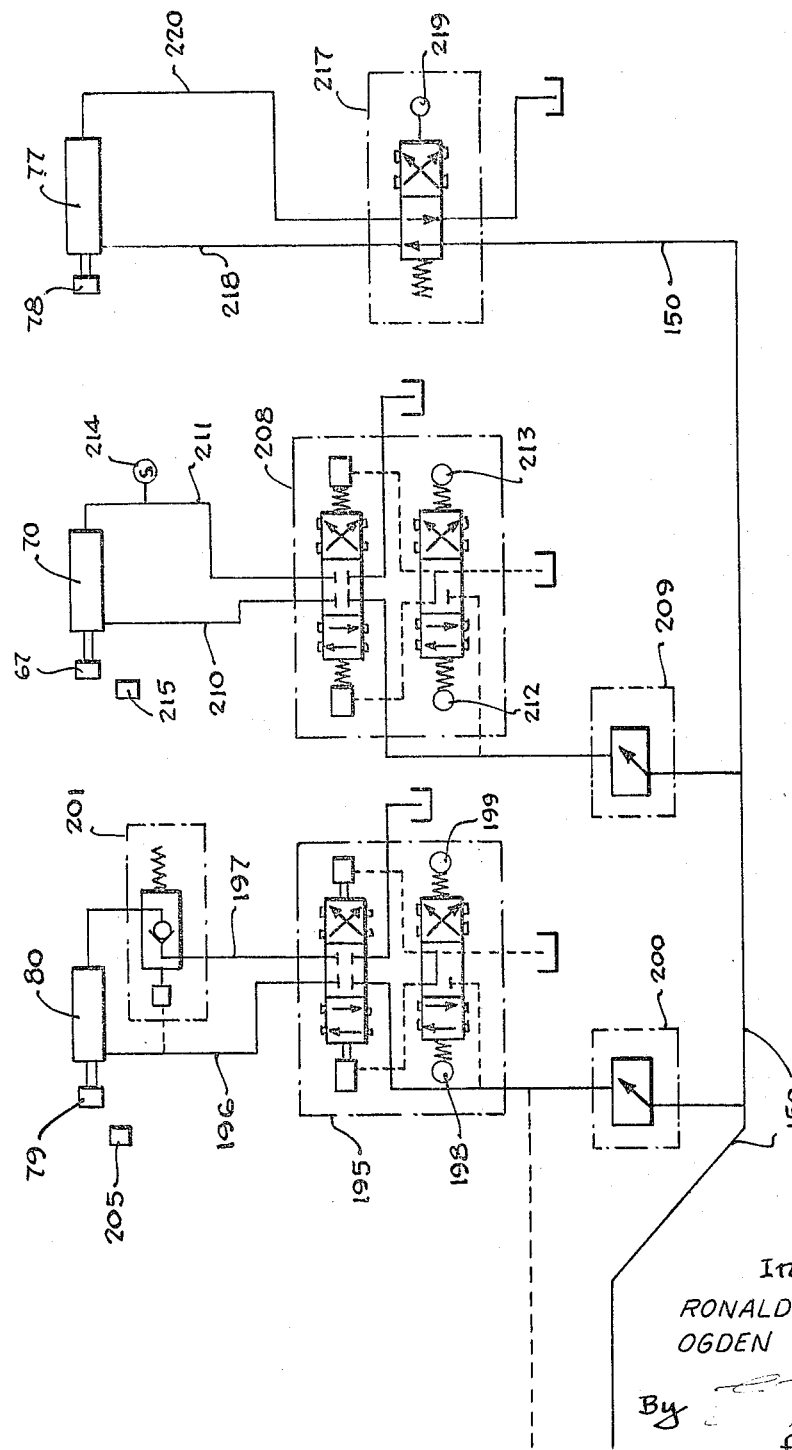

Inventors
RONALD E. SCHNEIDER
OGDEN A. CLEMENS
By / McCabe
Attorney

United States Patent Office 3,285,162
Patented Nov. 15, 1966

3,285,162
BACON PRESSING
Ronald E. Schneider, Garden City, Mich., and Ogden A. Clemens, Chicago, Ill., assignors to Swift & Company, Chicago, Ill., a corporation of Illinois
Filed Mar. 2, 1965, Ser. No. 436,431
5 Claims. (Cl. 100—42)

The present invention deals with an improved method for pressing material into a solid, substantially rectangular form. More specifically the present invention is an improved method for pressing bacon bellies into slabs suitable for slicing.

The present invention is of particular advantage in the food industry where it is often necessary to shape food material into a uniform solid for subsequent apportionment for further processing. The production of bacon slices is especially significant. Bacon bellies, from which sliced bacon is produced, are only roughly of rectangular solid form after being cut from an animal carcass, cured and smoked. Such bellies present three major dimensions, namely, thickness, width and length as measured in the respective vertical, lateral and longitudinal directions. However before such bellies are pressed into a more uniform shape they tend to curve in the lateral direction and taper in thickness at both ends, as measured in the longitudinal direction. Additionally at least one surface of such a slab is usually quite irregular. Accordingly it has been the regular practice to press such slabs, prior to slicing, into a more uniform rectangular shape.

In the past bacon pressing has required an operator to manually insert an unpressed slab into a press apparatus and thereafter manually remove the pressed slab before inserting a succeeding item. The most efficient prior apparatus for doing this comprised a six sided cavity in which a bacon slab is pressed in the three major dimensions and from which the slab was moved (for both insertion and removal) vertically through the top of the cavity. Such an arrangement has required that the top side of the pressed cavity be moveable through a relatively great distance and completely separable from all of the remaining five sides of the cavity to provide sufficient access for an operator to handle the bacon slabs. Due to such great movement the operating cycle of the press is relatively slow, particularly with respect to the theoretical rate at which a slicer may process bacon. It has accordingly been the practice in the past to either prepress and store quantities of slabs for subsequent slicing, or lower the slicing rate to accommodate a slower press, or provide a plurality of presses to feed a lesser number of slicing machines.

Furthermore, pressed slabs have left something to be desired in the squaring of the longitudinal ends thereof. Even after pressing the ends are uneven with the result that a significant number of slices taken at the end portions are of inferior quality with respect to slices taken from the center portion of a slab. Accordingly any improvement in the squaring of the ends will be reflected by higher yields of top quality slices.

It is therefore a principal object of the present invention to provide an improved method for pressing food material, such as bacon slabs, that overcomes the foregoing disadvantages.

It is another object of the present invention to provide an improved method for pressing bacon slabs, and the like, that results in a higher rate of production.

It is a further object of the present invention to provide an improved method that more uniformly and efficiently squares the ends of bacon slabs.

The method of the present invention broadly comprises the steps of laterally inserting a slab into a six sided rectangular pressing zone and thereafter successively compressing the slab in vertical, lateral, and longitudinal directions. The compressing of the slab is then partially released permitting the pressing zone to slightly expand under the influence of the slab; and immediately further compressing the slab in the longitudinal direction to square up the ends thereof into the slightly expanded zone. Thereafter all of the compressing forces acting on the slab are released and finally the slab is ejected automatically in a longitudinal direction from the zone.

An apparatus devised for carrying out the foregoing method fundamentally comprises a rectangular pressing cavity having six surfaces defined between a fixed bottom means and an opposingly spaced vertical top forcing means that is universally moveable in vertical, lateral and longitudinal directions. A lateral side retaining means is located at one side of the bottom means and is independently vertically moveable adjacent thereto. A longitudinal end forcing means is located at one end of the bottom means, independently moveable lonigtudinally there across and within the side retaining means. A lateral side forcing means is disclosed at a side of the bottom means opposite the side retaining means and is independently moveable laterally across the bottom means toward the aforementioned side retaining means, and is also moveable longitudinally across the bottom in association with the longitudinal forcing means. A longitudinal end retaining means is disposed to close an end of the cavity opposite the longitudinal end forcing means, and is independently moveable vertically and also moveable laterally in association with the lateral side forcing means. Separate reciprocal power means are associated with the five moveable surfaces.

Further objects and advantages of the present invention will become apparent upon reading the following specifications in conjunction with the drawings wherein:

FIGURE 3 is a detailed sectional view of a portion of the apparatus;

FIGURE 4 is a detailed sectional view of another portion of the apparatus;

FIGURE 5 is a simplified perspective illustration showing the relationship of the moveable surfaces of the press cavity;

FIGURE 6A and 6B is a hydraulic circuit for the apparatus of FIGURE 1; and

Figure 1:
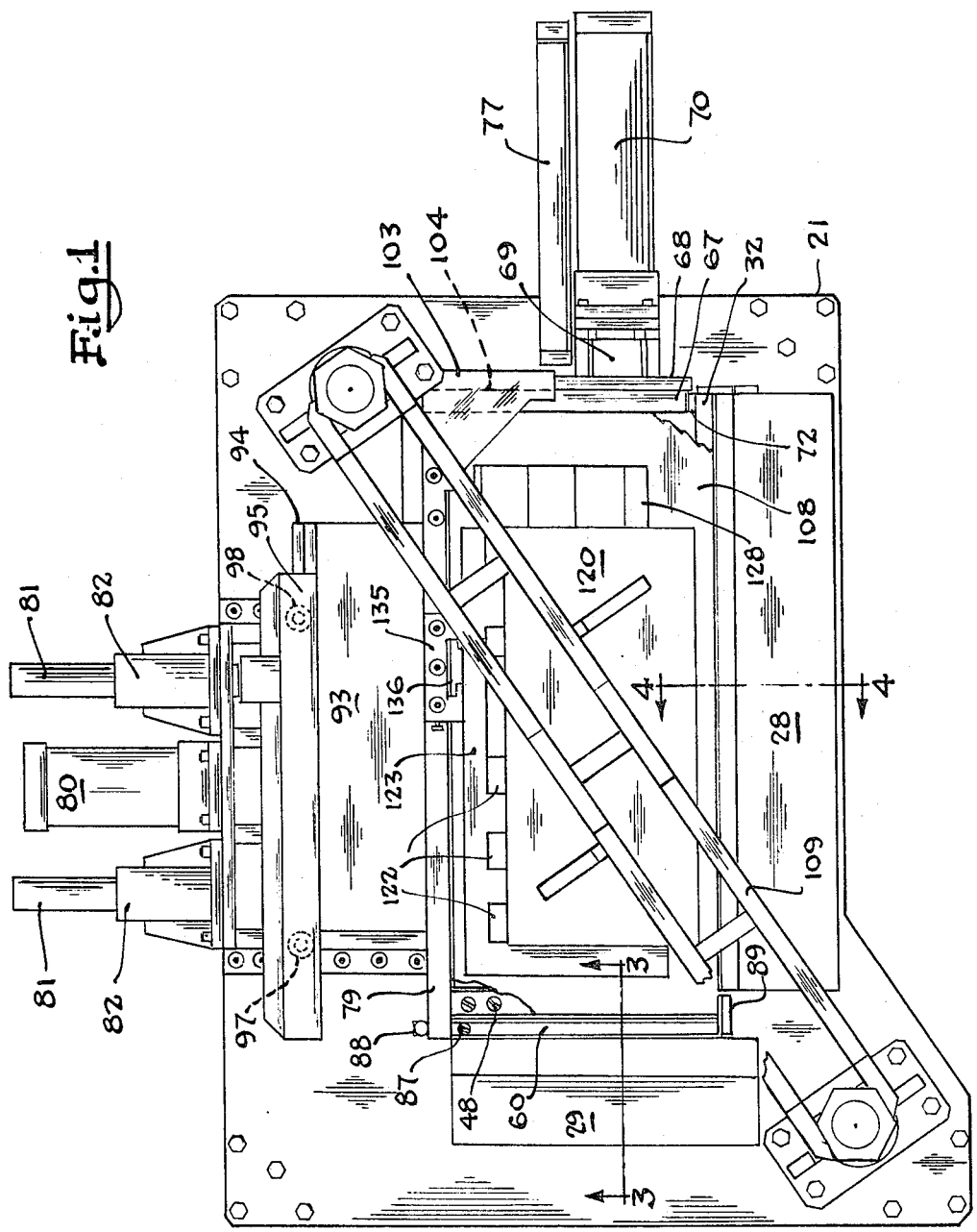
FIGURE 1 is a plan view of the apparatus of the present invention.

The illustrated apparatus was devised to carry out a preferred method of pressing bacon bellies into substantially rectangular slabs, considering that the slab is to be in a six-sided solid body, the pressing is done within a zone enclosed by six sides, namely: two longitudinal ends, two vertical surfaces, and two lateral sides. Preferably the belly is first introduced into an expanded zone through a lateral side and ultimately ejected therefrom through an adjacent longitudinal end.

The belly is first positioned longitudinally parallel and alongside the pressing zone. An adjacent first lateral side of the zone is then opened and the belly is moved in a first lateral direction into the zone. Thereafter the side of the zone is closed.

The enclosed belly is then subjected to compressive forces in three directions and in rapid succession by reducing the size of the zone; and during application of the last compressive force the belly is allowed to expand slightly in at least one of the other two directions. Preferably the upper surface of the zone is forced downwardly until it reaches a preset spacing from the bottom surface, thus vertically compressing the belly. Thereafter the second lateral side of the zone opposite to the first side of entry is forced in a direction opposite to the first mentioned lateral direction until it reaches a preset spacing from the first lateral side, thus compressing the belly in a lateral direction. Then a first longitudinal end of the zone is moved inwardly, thereof, until a desired force is exerted upon the belly. Thereupon the vertical compression of the belly is partially relieved by allowing the upper surface to retreat slightly under the internal forces created within the slab by the longitudinal compression. At the same time the inward longitudinal compressive movement of the end of the zone is continued to expand the belly slightly in the vertical dimension, particularly at the longitudinal ends thereof.

Thereafter the compressive forces are completely relieved by fully re-expanding the zone. This is preferably accomplished by withdrawing the upper surface and second lateral side, and by opening the second longitudinal end opposite the first mentioned longitudinal end. Immediately thereafter the pressed slab is ejected from the expanded zone in a longitudinal direction through the open longitudinal end.

Referring to the apparatus as illustrated in the drawings, the functional portions of a press are best seen in the diagrammatic illustration of FIGURE 5. The operative elements therein illustrated comprise the bottom means, generally 11, which is fixed rigidly in position. A lateral side retaining means, generally 12, is positioned for vertical reciprocation only with respect to the bottom means along one side thereof, and is immovable longitudinally or laterally. A longitudinal end forcing means, generally 13, is positioned perpendicular and adjacent the side retaining means at a rear end of the bottom means and is reciprocable thereacross in only the longitudinal direction, and similarly across the inner-surface of the side retaining means. A lateral side forcing means generally 14, is positioned across the bottom means, opposing the side retaining means 12, and is independently reciprocable laterally across the bottom means and also across the inner or forward surface of the longitudinal end forcing means 13. The lateral side forcing means, 14, is also movable in the longitudinal direction by the end forcing means 13. At the forward end of the cavity, a longitudinal end retaining means, generally 15, is positioned for both vertical and lateral movement so as to be reciprocably slideable across a forward edge of the side retaining means, 12, and also across an inner surface of the side forcing means 14. Finally an upper closure of the cavity is formed by a vertical top forcing means generally 16, that is spaced parallel above the bottom means 11 and is mounted for reciprocable movement in all three directions, namely longitudinal, lateral and vertical. Primarily the top forcing means, 16, is adapted for independent vertical movement to press downward toward the bottom platen and compress a slab therebetween. The top forcing means, 16, is slideable across the inner surfaces of both the side and end forcing means, 14, 13, respectively, while in sliding vertical abutment with the upper edges of both the side and end retaining means, 12, 15, respectively. The top forcing means is movable laterally by the side forcing means 14; and is movable longitudinally by the end forcing means generally 13, both side and end forcing means being in sliding horizontal abutment with the top forcing means as described.

Now referring to the preferred embodiment shown in detail in the drawings, the apparatus is seen to be constructed upon a machine bed consisting of a bed plate 21 and a plurality of reinforcing channels 22 welded to the underside thereof. The machine bed is supported upon four heavy duty legs 23. The press cavity is spaced above the bed plate 21 by a rectangular bottom frame generally 26. The bottom means generally 11 is comprised of a bottom platen 27, which is welded or otherwise firmly secured to the top of the bottom frame 26, and a pair of adjacent access ramps, namely a side ramp generally 28 at one side of the bottom platen 27 and an end ramp generally 29 at the forward end of the platen 27 (to the left as seen in FIGURE 1). The side retaining means generally 12 is located between the side ramp generally 28; and the end retaining means generally 15 is located between the end ramp generally 29 and the bottom platen 27.

FIGURE 4 illustrates the structure of side retaining means generally 12 in detail. The side ramp generally 28 comprises a relatively heavy side force plate 30 and an inclined guard 31 extending from the top thereof to the bed plate 21. The side retaining means generally 12 is preferably of the form of a side gate 32 having an L shaped foot 33 with antifriction bearing strips 34, 35 secured to the vertical face of the foot 33 and the top edge of the gate 32, respectively. Additional antifriction bearing strips 36, 37 are secured to opposing portions of the edge of the bottom platen 27 and the side force plate 30, respectively.

Preferably the aforementioned and other antifriction bearing strips are formed of a self lubricating solid material such as a fluorinated hydrocarbon plastic one example of which is sold under the trade name Teflon. These and other antifriction bearing strips are desirably mounted with a plurality of screws or bolts or the like so as to be removable and replaceable.

The aforementioned side gate 32 is vertically reciprocable from within the space between the side force plate 30 and the rectangular bottom frame 26 to a position above the bottom frame by means of a hydraulic cylinder 40 which is secured beneath the bottom platen 27 and connected to the side gate 32 by a piston rod 41. The piston rod 41 may be suitably keyed to the gate as are a pair of guide rods, not shown, which are located toward the ends of the side gate 32, which are slidingly mounted in a pair of bushings, not shown.

The end retaining means generally 15 and associated end ramp generally 29 are of similar construction. The end ramp is comprised of a heavy end force plate 45 extending vertically from the bed plate 21 to a horizontal cap 46 that is coplanar and opposite the bottom platen 27. An inclined slide 47 extends downwardly from the cap 46 to the bed plate 21. An end gate 48 extends laterally with respect to the end of bottom platen 27 between the end force plate 45 and the bottom frame generally 26. The end gate 48 is reciprocable from a position between the end force plate 45 and bottom frame 26 and a position thereabove, by means of a piston rod 49 extending from a hydraulic cylinder 50 which is also mounted beneath the bed plate 21. The vertical attitude of the end gate 48 is kept even by a pair of guide rods 51 which slidingly extend through bushings 52 beneath the bed plate 21.

The end gate 48, however, differs from the side gate 32 in that the end gate is moveable laterally as well as vertically. This is accomplished by slidingly mounting the end gate itself upon a horizontal, laterally extending J shaped slide 53 to which the piston rod 49 and guide rods 51 are attached. A toe 54 of the J slide 53 is received in a horizontally extending recess in the bottom of end gate 48. The latter structure contains suitable antifriction bearings and the end gate 48 includes two antifriction bearing strips 55, 56 mounted on the bottom thereof, adjacent the bottom frame 26, and top edge thereof, respectively. A similar antifriction bearing strip 57 is secured to the forward edge of the bottom platen 27.

A laterally extending horizontal spacer 60 is also mounted for lateral reciprocation between the end force plate 45 and end gate 48. The spacer 60 includes a lower flange 61 which is slidingly received in a groove in the end force plate 45. A pair of antifriction bearing strips 63, 64 are secured to opposite faces of the spacer 60 so as to slidingly engage the end force plate 45 and end gate 48 respectively.

It will be noted that the end gate 48 is slideable laterally across one end (the left end as viewed in FIGURE 1) of the side gate 32. Accordingly a suitable antifriction bearing strip is preferably mounted on that end of the side gate (not shown).

The previously mentioned end forcing means generally 13 is mounted at an end of the bottom platen 27 opposite end gate 48. The latter means comprises an end ram 67 mounted on the forward face of a backing member 68 which is in turn reciprocable in a longitudinal direction across the bottom platen 27 by means of a piston rod 69 extending from a hydraulic cylinder 70. The hydraulic cylinder 70 is mounted upon a bracket that is secured to the bed plate 21 to the right of the bottom frame generally 26 as viewed in FIGURES 1 and 5. The end ram 67 extends laterally slightly beyond the end of the backing member and has a vertical antifriction bearing strip 72 secured to that end adjacent the side gate 32. It will have become apparent that the end ram 67 is moved in sliding contact with the side gate 32. A similar antifriction bearing strip (not shown) is mounted beneath the end ram and in sliding contact with the upper surface of the bottom platen 27.

Figure 2:
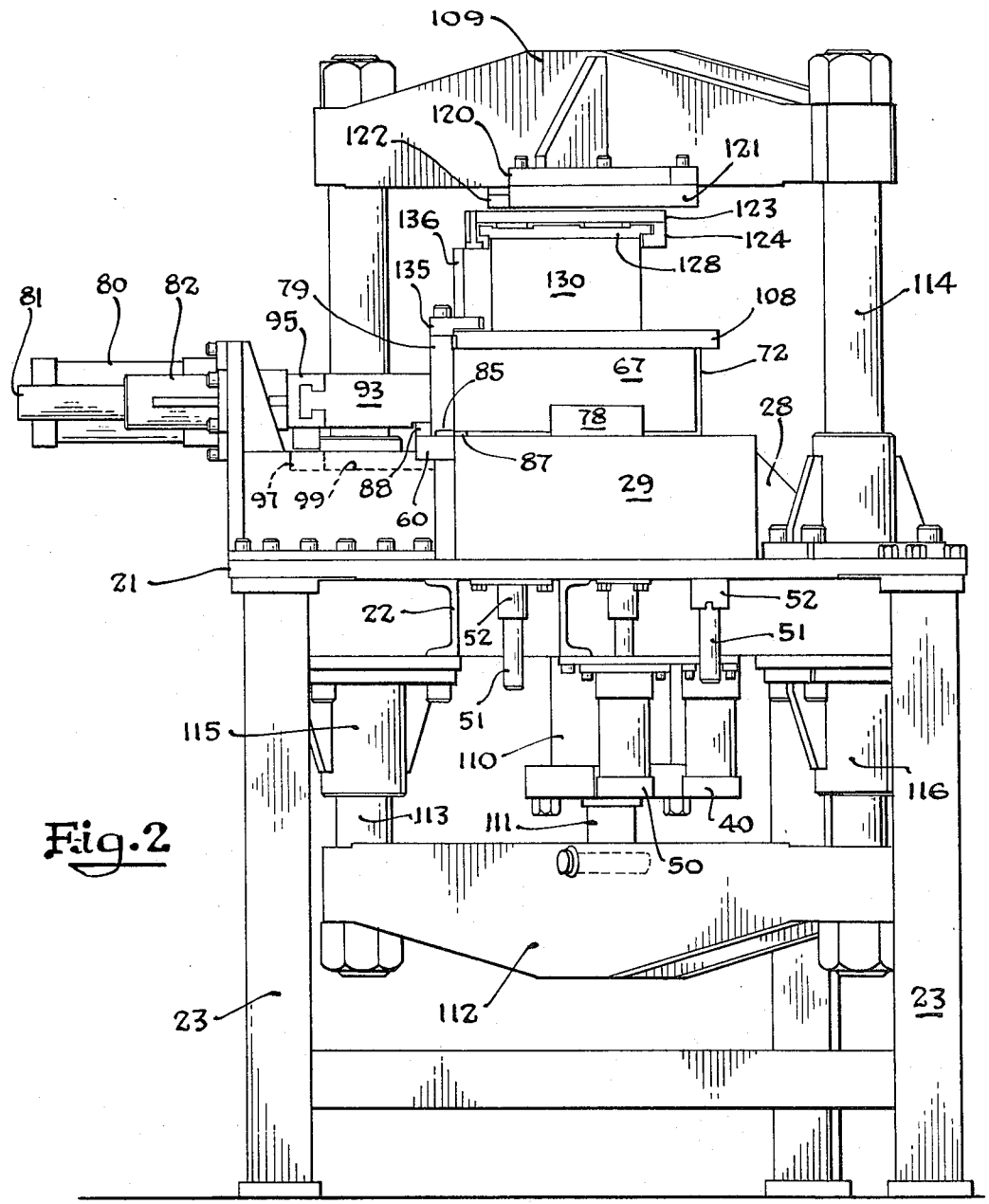
FIGURE 2 is an end view of the apparatus of FIGURE 1.

Preferably the end ram 67 includes an ejector means constructed therein. The latter may take the form of the illustrated hydraulic cylinder 77 and ejector bar 78. In this form the hydraulic cylinder 77 is mounted adjacent the cylinder 70 (as seen in FIGURE 1) and the ejector bar 78 constitutes a portion of the end ram (as seen in FIGURE 2 wherein the end gate 48 and side gate 32 are shown lowered for clarity). The entire ejector means generally may be supported from the backing member 68 and moves longitudinally with the end ram 67 as well as independently thereof.

The detailed description thus far has explained the structure of the bottom and three sides of the press cavity. A fourth side of the cavity comprises the previously mentioned lateral side forcing means generally 14 which comprises a side ram 79 that is forced laterally across the bottom platen 27 by means of a hydraulic cylinder 80 which is secured by a mounting bracket to a side of the machine bed. The side ram is positioned opposite and parallel to the side gate 32. A pair of guide rods 81 slidably mounted in bushings 82 outboard of the hydraulic cylinder 80 assist in maintaining the parallel relationship. As may be seen in FIGURE 2 the undersurface of the side ram 79 has secured thereto an antifriction bearing strip 85 similar to those previously described. Also it will be understood that the rear vertical edge of the side ram 79 slides across the forward face of the end ram 67. Accordingly that end of the side ram has secured thereto an additional antifriction bearing strip (not shown).

It will also be clear that lateral movement of the side ram 79 is utilized to move the end gate 48 laterally above the bottom platen 27. The latter is accomplished on inward movement of the side ram 79 by reason of the fact that the latter is in abutment with an end of the end gate 48. (That end of the end gate is also supplied with an antifriction bearing to facilitate longitudinal sliding of the side ram 79 thereacross.) The same movement of the end ram 79 concurrently moves the horizontal spacer 60 by way of a pin 87 fastened on the top surface of the latter adjacent the inner face of the ram 79. Return or reverse movement of the side ram 79 is translated to the end gate 48 through the aforementioned spacer 60 by way of a roller cam 88 on the spacer 60 and engaging the rear face of side ram 79, and a dog 89 secured to the opposite end of the spacer and extending into engagement with the corresponding end of the end gate 48.

Referring more specifically to the details of the side ram construction as best seen in FIGURES 1 and 2, the side ram 79 is secured by bolts to a mounting block 93. The latter is a solid rectangular block of metal which is formed into a key 94 along the outer edge parallel to the ram 79. A channel member 95 having a keyway machined to slidingly embrace the key 94 is mounted on the latter. It is the channel member 95 to which the hydraulic cylinder 80, and guide rods 81, which effect lateral movement of the side ram 79, are attached. Exceptionally heavy force which may be operative upon the working face of the side ram 79 may tend to turn the mounting block 93 and channel member 95 slightly askew. Any movement in this connection might tend to jam key 94 and keyway and prevent longitudinal movement of the ram 79 as applied by the end ram 67.

The guide rods 81, of course, inhibit such jamming movement; however, a preferred construction provides almost complete protection against such an occurrence. The latter comprises a pair of rollers 97, 98, rotatively attached to the undersurface of the outer portion of the channel member 95. Both rollers ride in contact with the outer edges of a track plate 99 which is secured to an outward extension of the bottom platen 27 beneath the mounting block 93 and channel member 95. Rollers 97, 98 in contact with the track plate 99 effectively prevent any longitudinal displacement of the channel member 95 which might otherwise jam operation of the hydraulic cylinder 80.

As previously mentioned, the foregoing structure of the side ram 79 permits longitudinal displacement thereof by way of the mounting block 93 sliding with respect to its channel member 95. Such longitudinal displacement is caused by movement of the end ram 67. Forward movement, to the left in FIGURE 1, of the latter simply forces the end ram 79 in that direction. However, return of the end ram is provided through a longitudinal return means which comprises a triangular bracket 103 that is secured to the adjacent upper edge of the end ram 67. A leg of bracket 103 overlies the adjacent end of the end ram backing member 68. A channel or angle strip 104 extends below the bracket 103 into sliding contact with the rear base of the backing member 68 and is caused to be withdrawn therewith, thus longitudinally withdrawing the side ram 79.

The enclosure of the press cavity is completed by a vertically movable top forcing means, generally 16, which constitutes a top platen 108 held to the bottom platen 27 beneath an upper yoke assembly 109. Vertical movement of the upper yoke assembly 109 and top platen 108 is effected by a hydraulic cylinder 110 which is mounted beneath the machine bed. A piston rod 111 of the latter cylinder is connected to a lower yoke assembly 112 and vertical movement of the latter, induced by the hydraulic cylinder 110, is transmitted to the upper yoke assembly 109 through a pair of diagonally opposite vertical shafts 113, 114. These shafts are vertically slideable in bearing collars 115, 116 respectively.

The top platen 108 is mounted to the upper yoke assembly 109 in a manner so as to be substantially universally adjustable with respect thereto. That is, the top platen 108 is mounted so as to be movable laterally and longitudinally as well as vertically. This is accomplished by a structure visible in FIGURES 1, 2 and 5. A yoke plate 120 is fixed to the upper yoke 109. A plurality of lateral keyway tracks 121 are secured to the underside of yoke plate 120. Within the latter an equal number of lateral key rails 122 are slideably engaged. These are fastened to a lateral slide plate 123 which is thus movable laterally with respect to the yoke plate 120. Opposite longitudinal edges of the lateral slide plate 23 carry angle corners 124 the inner portions of which are covered by antifriction bearing strips. Within the latter is slideably mounted a longitudinal slide plate 128 which bears a plurality of wide antifriction bearing strips on its upper surface for sliding contact with the under surface of lateral slide plate 123. The longitudinal slide plate 128 has a plurality of vertical risers 130 fastened between its under surface and the upper surface of the top platen 108. It will thus be seen that vertical movement of the upper yoke assembly 109 will directly move the top platen 108. However, in addition the latter is movable laterally by reason of lateral keyway tracks 121, and movable longitudinally by reason of the angle corners 124.

Lateral and longitudinal movement of the top platen is imparted by the side rams 79 and end ram 67 respectively. It will be seen in the figures that an adjacent side and end of the top platen 108 are in abutment with the inner faces of side ram 79 and end ram 67 respectively. At the opposite side and end the top platen 108 is in horizontal abutment to slide across the bearing strips 35, 56 on the side gate 32 and end gate 48, respectively. Reverse lateral and longitudinal movement is translated to the top platen 108 through a horizontal reverse means that is attached to the upper edge of the side ram 79.

It should be kept in mind that the latter is moved laterally by its cylinder 80 and longitudinally by the end ram 67 and its cylinder 70. The horizontal reverse means comprises a C shaped jaw 135 which is fastened by bolts or the like to the upper edge of the side ram 79. The jaws of the latter member engage the cross bar of a T member 136 that extends vertically along a corresponding edge of one riser 130. Hence, reverse movement in either the lateral or longitudinal directions will be imparted to the top platen 108 and its supporting structure by way of the C shaped jaw 135.

Since the top platen is movable vertically across the inner faces of both the side ram 79 and end ram 67 suitable antifriction bearing strips (not shown) are secured to the corresponding edges thereof.

Figure 6A:
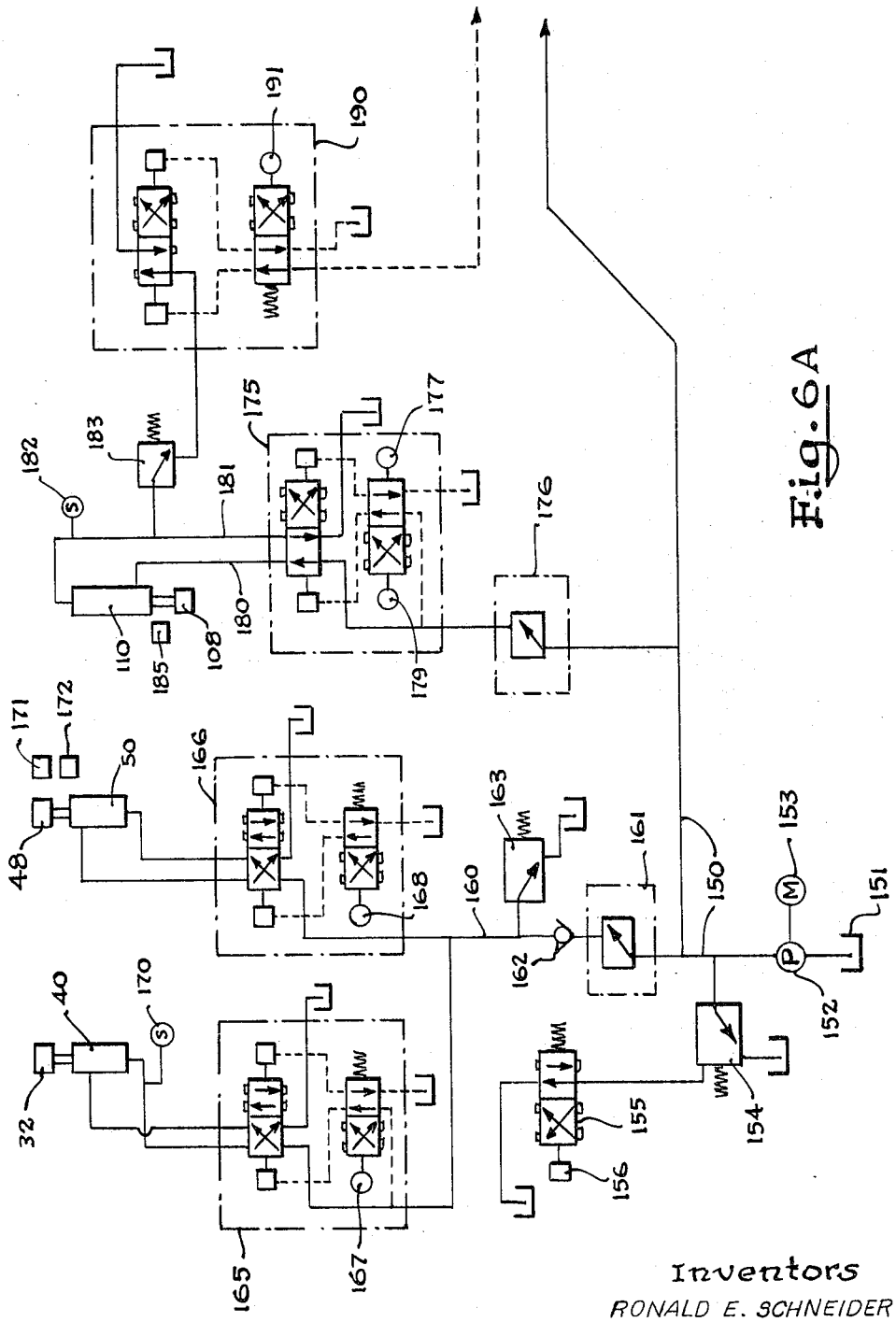
Figure 7:
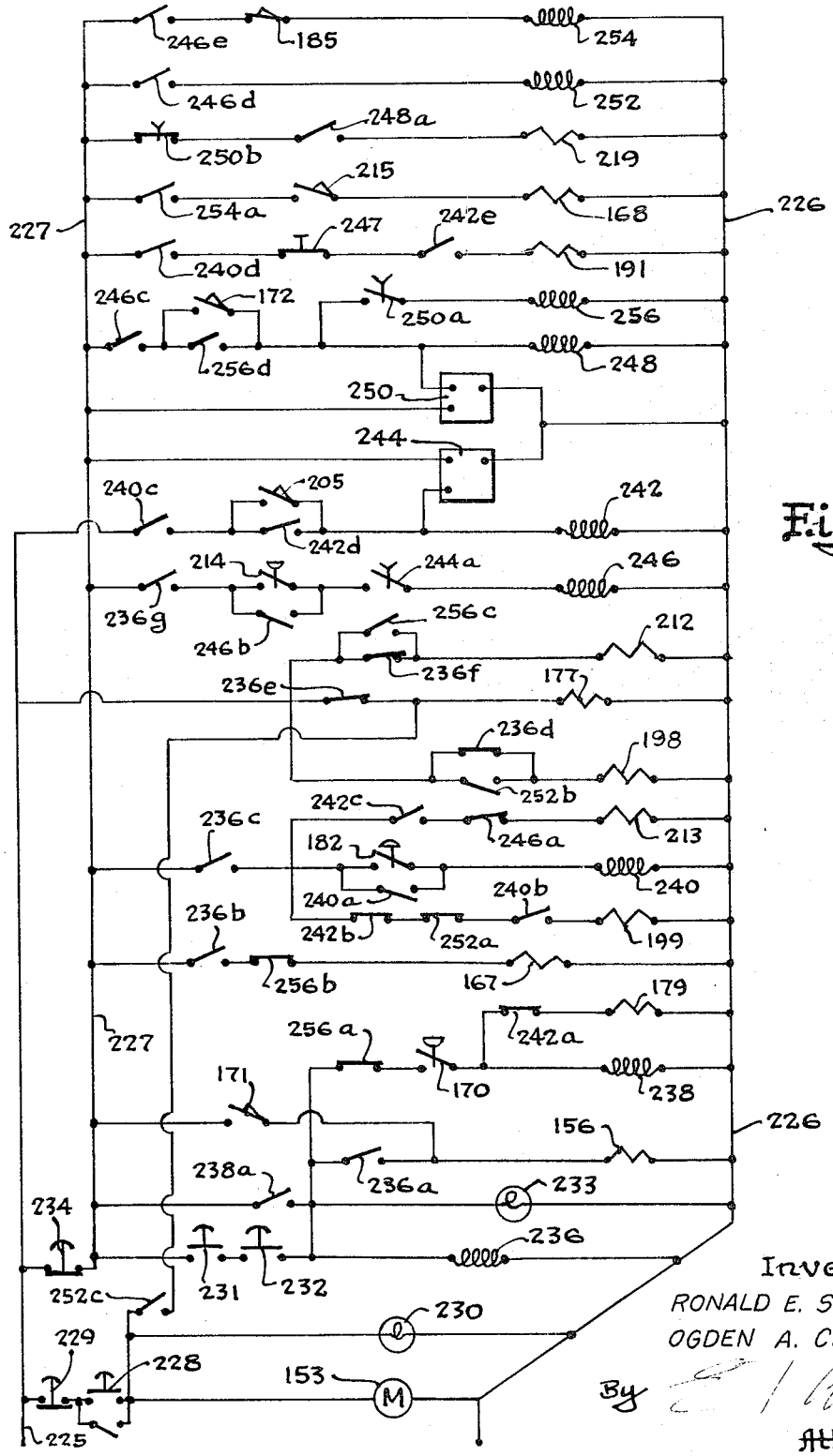
FIGURE 7 is an electrical circuit of the apparatus of FIGURE 1.

The dynamics of the above-described apparatus and its operation may be followed with reference to FIGURES 6 and 7 illustrating simplified hydraulic and electrical control circuits. As may be seen in FIGURES 6A and 6B the hydraulic system for operating the various cylinders incorporates at least an equal number of four-way control valves, the forward and reverse ends of each cylinder being connected by a pair of pipes to the respective control valve and thence by pipes to a main supply manifold 150 and also to a sump 151.

Hydraulic fluid is drawn from the sump 151 by a pump 152 driven by a motor 153 and forced into the manifold 150 at high pressure. A relief valve 154 regulates maximum fluid pressure and a four-way vent valve 155 is connected thereto to divert the fluid directly to the sump from the pump when the system is inoperative. The vent valve 155 is spring biased to the open, or divert, position, and is actuated by a solenoid 156 to close and force fluid to be directed to the various cylinders.

Viewing FIGURES 6A and 6B from left to right, the cylinders 40 and 50 of side gate 32 and end gate 48, respectively, are supplied from manifold 150 through a branch pipe 160. The latter includes a reducing valve 161, and a one-way check valve 162 to control pressure level and prevent reverse flow, respectively. A relief valve 163 is located between the check valve and the respective cylinders 40, 50 to enable fluid to be forced out of the latter when the top platen 108 is forced downwardly against the tops of end gate 32 and side gate 48 and depresses them. From the relief valve 163 the branch pipe 160 divides to a four-way valve 165 connected to cylinder 40 and a four-way valve 166 connected to cylinder 50.

Each valve 165, 166 is of standard construction incorporating a hydraulically shiftable control spindle and a solenoid operated pilot spindle for actuating the former. In valves 165 and 166 the pilot spindles are spring biased to normally cause fluid to be directed to one end of the cylinders 40, 50; and solenoids 167, 168 are attached to the pilot spindles of valves 165, 166 respectively to cause fluid to be redirected, upon actuation, to the opposite ends. Valve 165 normally directs fluid to the forward end of cylinder 40 to lower gate 32. Valve 166 normally directs fluid to the rear end of cylinder 50 to raise gate 48.

Additionally a pressure responsive switch 170 is located in the pipe leading to the rear of cylinder 40. A pair of normally open limit switches 171, 172 are positioned adjacent end gate 48 so as to be closed when the gate moves down. Switch 171 is closed when the gate starts down from the full up position, and switch 172 is closed when the gate reaches a full down position.

Referring next to cylinder 110 operating the top platen 108, a similar four-way control valve 175 is connected between the cylinder and a reducing valve 176 connected to manifold 150. However the pilot spindle of valve 175 is actuated alternately by two solenoids 177, 179 to direct pressure fluid into pipes 180, 181, respectively, connected to the forward and rear ends of cylinder 110. A pressure responsive switch 182 is located in pipe 181 adjacent the rear of cylinder 110; and a relief valve 183 is also connected to pipe 181 between the switch 182 and control valve 175. A normally closed limit switch 185 is located in the path of the top platen 108 to be opened whenever the latter moves away from a fully up position.

The top platen system is devised to exert a desired pressure against a slab while being pressed also from a side and end, yet float up upon the condition that the forces exerted by the slab against the platen exceed the hydraulic forces in cylinder 110. Upon that condition occurring fluid may be driven from the rear of cylinder 110 through pipe 181 and out relief valve 183, provided that a further four-way valve 190 is actuated to connect the relief valve 183 to the sump 151. The valve 190 is spring biased to block the relief valve 183 and is actuated to connect the latter to the sump by a solenoid 191.

Next considering cylinder 80 of side ram 79, it is controlled by a four-way valve 195 connected between it and manifold 150. Valve 195 is normally spring biased to a neutral position blocking fluid flow in both pipes 196 and 197 to the forward and rear ends, respectively, of cylinder 80. A pair of solenoids 198, 199 are independently operable to actuate a pilot spindle of the valve 195 to direct pressure fluid into pipes 196, 197 respectively. The pressure of the fluid is established by a reducing valve 200 located between valve 195 and manifold 150. Also a releasable check valve 201 is located in pipe 197 to normally prevent forces in the pressed slab from reversing the ram 79. Preferably the latter advances inwardly a variable preset distance until it closes a normally open limit switch 205 (the position of which is manually adjustable). That causes valve 195 to be shifted to neutral position. The check valve 201 will be unseated, however, to permit rapid reversal of ram 79 when valve 195 is shifted to direct pressure fluid into pipe 196.

Cylinder 70 of the end ram 67 is connected to a similar four-way valve 208 having a spring biased neutral position. Fluid is delivered to valve 208 from manifold 150, through a reducing valve 209, and thence through one of a pair of pipes 210, 211 to the forward and rear ends, respectively, of cylinder 70. A pair of solenoids 212, 213 actuate valve 208 to independently direct pressure fluid into pipes 210 and 211. A pressure responsive switch 214 is located in pipe 211. Additionally a normally open limit switch 215 is located in the path of ram 67 to be closed thereby upon its extension from cylinder 70. Finally a simple four-way valve 217 is connected between the manifold 150 and cylinder 77 of ejector 76. The valve 217 is spring biased to direct fluid through a pipe 218 to the forward end of cylinder 77 thus holding the ejector 76 withdrawn. A solenoid 219 is connected to actuate valve 217 to direct pressure fluid into a pipe 220 to the rear of cylinder 77 to extend the ejector.

The hydraulic system, above described, is coordinated and actuated in proper sequence by an electrical circuit shown basically in FIGURE 7. This circuit electrically connects the various solenoids and switches, above identified, between electrical bus lines 225, 226 and 227 and with an arrangement of relays and timers for automatic sequence control. The electrical circuit and operation of the apparatus may be best understood by following the sequence of operations. It should be understood that the various switching steps occur very rapidly as an entire pressing cycle may require less than thirty seconds.

Referring to FIGURES 6 and 7, an attendant first initiates the apparatus by closing a starting switch 228 to energize motor 153. (The motor and jump 152 may be stopped at the end of operations by opening another switch 229.) A motor indicator light 230 signals operation. Excess fluid will thus be circulated through the pump 152 and valves 154, 155 and returned to the sump 151 as the solenoid 156 of valve 155 is not yet energized.

The condition of the press apparatus at this point is: end gate 48 is up, maintaining limit switches 171 and 172 closed; and side gate 32 is down. Power is connected to solenoid 177, 198 and 212 of valves 175, 195 and 208, respectively, to direct pressure fluid to maintain top platen 108, side ram 79 and end ram 67 withdrawn. The attendant inserts a slab of bacon for pressing and then closes manual switches 231, 232 with both hands and holds them closed until sidegate 32 reaches a full up position. This procedure activates the control circuit while insuring that the attendant's hands are free of the press apparatus. An indicator light 233 will illuminate. The control circuit may be manually interrupted at any time thereafter by opening an emergency switch 234 in bus line 227.

Closing of switches 231, 232 energizes a relay coil 236, which powers seven relay switches 236a through 236g. Relay switch 236a is closed to connect solenoid 156 to power causing the latter to close valve 155 forcing all pressure fluid to go through manifold 150. Relay switch 236b is closed to complete a connection to solenoid 167 causing valve 165 to shift and direct fluid to raise the side gate 32. Relay switch 236d is opened to disconnect a circuit that initially maintained solenoid 198 of valve 195 energized. Relay switches 236c and 236g close partially complete other circuits to be subsequently explained; and relay switches 236e and 236f are opened to temporarily disconnect circuits to solenoids 177 and 212 associated with valves 175 and 208 for the top platen 108 and end ram 67, respectively. (Valve 175 does not change position, but valves 195 and 208 are biased to move to neutral.)

When the side gate 32 reaches full up position hydraulic pressure in the rear of cylinder 40 will increase sufficiently to close the pressure switch 170. A circuit to a relay coil 238 is thereby completed causing a single relay switch 238a to close providing an alternate electrical path, parallel to manual switches 231, 232 (now released), to relays 236 and 238, lamp 233 and solenoid 156. At the same time pressure switch 170 also completes a circuit to the solenoid 179 thereby actuating valve 175 to direct pressure fluid through pipe 181 to the rear of cylinder 110 to cause the top platen 108 to be lowered.

Lowering of the top platen 108 opens the limit switch 185 to be later explained. Upon the platen reaching the lowermost position, which is against a stop block inserted by the attendant, the fluid pressure in pipe 181 will increase and close the pressure switch 182. The latter completes a circuit through relay switch 236c to a relay coil 240 which powers four relay switches 240a through 240d, all being moved closed thereby. Relay switch 240a provides a holding circuit parallel to pressure switch 182. Relay switch 240b completes a circuit to the solenoid 199 thereby causing valve 195 to direct pressure fluid through pipe 197 to the rear of cylinder 80 to advance the side ram 79.

Relay switch 240c and 240d partially close circuits to be later explained.

Referring to the side ram 79, the attendant has previously positioned the normally open limit switch 205 to fix the desired width of the pressed slab. Upon the ram 79 closing the limit switch 205 a circuit is completed therethrough, and through relay switch 240c, to a relay coil 242 and a timer relay 244. At this instant the timer relay begins to time out a selectable period that will control the duration of the pressing cycle. The timer relay powers a single, normally open, timer switch 244a, to be subsequently explained, and will close that switch at the end of the timed period, for example after about 15 seconds.

Relay coil 242 powers five relay switches 242a through 242e. Relay switch 242a is opened thereby deenergizing solenoid 179 and preparing valve 175 (cylinder 110) to be shifted. Relay switch 242b is opened to deenergize solenoid 199 of valve 195 (cylinder 80), permitting the latter to shift to a neutral position effectively locking the position of side ram 79. Relay switch 242c is closed to complete a circuit to solenoid 213 thereby shifting valve 208 from neutral to direct pressure fluid to the rear of cylinder 70 and advance the end ram 67. Relay switch 242d is closed to complete a holding circuit to its coil 242 parallel to the limit switch 205; and relay switch 242e is closed to complete a circuit, including previously closed relay switch 240d, to the solenoid 191 which immediately acts to shift valve 190 to permit fluid from the rear of cylinder 110 to be expelled through relief valve 183. (The latter will occur only when the forces developed in the pressed slab by the end ram 67 are sufficient to overcome the relief valve 183.)

Since pressure fluid is now being delivered to the rear of cylinder 70 the end ram 67 moves forward and closes the limit switch 215 to partially complete and prepare a circuit to solenoid 168 associated with the end gate 48. Solenoid 168 will not be energized until a further switch is closed.

Also when a sufficient resistance to the end ram 67 occurs in the pressed slab fluid pressure will build up in pipe 211 sufficiently to close the pressure switch 214 which closes in series with previously closed relay switch 236g. A circuit will be completed through switches 236g and 214 to a relay coil 246 when timer 244 times out and causes timer switch 244a to close. One result of relay 246 coil being energized is to terminate advance of the end ram 67. Stated differently the end ram will be halted when both pressure switch 214 and timer switch 244a are closed, although they may close in either order. Thus a minimum time of pressing is assured as will as achievement of a minimum force on the slab, both factors contributing to the production of a properly pressed bacon belly.

Preferably during advancement of end ram 67 the relief valve 183 for the top platen cylinder 110 will dump fluid through valve 190. This results in a superior squaring of the ends of the slab. However, if for some reason the attendant does not desire this feature, the valve 190 may be rendered inoperative in the closed position by manually opening a normally closed switch 247 in series with the solenoid 191.

Also the relief valve 183 and pressure switch 214, as will as timer 244, are preferably variable at the attendant's discretion so that optimum pressing conditions for a given type of slab may be obtained. It is to be understood that, for example, relatively cold bacon bellies are harder to press and may require greater pressing forces and time periods as compared to warmer bellies which are more easily pressed at lower pressures and shorter time periods.

When both the pressure switch 214 and timer switch 244a are closed the relay coil 246 will be energized to power five relay switches 246a through 246e. Relay switch 246a is opened to disconnect the circuit previously established to solenoid 213 thereby allowing valve 208 to shift to neutral and lock the position of end ram 67. Relay switch 246b is closed to provide a holding circuit for its relay coil 246 parallel to the pressure switch 214.

Relay switch 246c is closed to partially complete a circuit to further relay coil 248 and to trigger an ejector timer relay 250. Relay switch 246d is closed and completes a circuit to still another relay coil 252 which will be further explained. Finally relay switch 246e partially completes a circuit through previously opened limit switch 185 (associated with the top platen 108) to still another relay coil 254.

At this point pressing of the slab is virtually complete, and it remains to eject the slab from the press and return the apparatus to a condition to receive the next slab.

The energized relay coil 252 (connected to relay switch 246d) powers three relay switches 252a through 252c. Relay 252a is opened to deenergize solenoid 199 thus allowing valve 195 (cylinder 80 of side ram 79) to shift to neutral. However, at the same time relay switch 252b reconnects the circuit to solenoid 198 to thereby shift valve 195 fully to direct pressure fluid into pipe 196 to cause the side ram 79 to be withdrawn. Finally relay switch 252c is closed to energize solenoid 177, reversing valve 175 to direct pressure fluid into pipe 180, thereby causing cylinder 110 to lift the top platen 108 to a full-up position.

The withdrawal of side ram 79 and top platen 108 reopens limit switch 205 and recloses limit switch 185, respectively. The closing of limit switch 185 completed the circuit through previously closed relay switch 246e to relay coil 254.

Relay coil 254, now energized, powers a single relay switch 254a to the closed position completing a circuit to solenoid 168 through previously closed limit switch 215. This shifts valve 166 to deliver pressure fluid to the forward end of cylinder 50 thus lowering end gate 48. The limit switches 171 and 172 will accordingly be closed. Limit switch 171 is closed as the gate 48 starts down and provides an alternate electrical path to maintain solenoid 156 energized to hold the dump valve 155 closed. Limit switch 172 is closed upon the gate 48 reaching bottom and completes a circuit, through previously closed relay switch 246c, to energize relay coil 248 and trigger the timer 250. The latter operates two timer switches 250a and 250b after a brief period established at, for instance, about five seconds.

Instantaneously the relay coil 248 powers a single relay switch 248a to close and complete a circuit through normally closed timer switch 250b to energize the solenoid 219. This shifts valve 217 to cause the ejector 76 to be extended to push the slab from the cavity across the lowered end gate 48. The ejector itself is preferably not extended beyond the end gate.

Thereafter the ejector timer 250 times out and powers timer switch 250a to close and timer switch 250b to open. The latter disconnects solenoid 219 permitting valve 217 to return to its biased position directing pressure fluid to the forward end of cylinder 77 and withdrawing the ejector 76. Timer switch 250a completes a circuit through previously closed relay switch 246c and limit switch 172 to energize another relay coil 256. The latter powers four relay switches 256a through 256d. Relay switch 256a breaks the circuit to relay coil 238 (and also to solenoid 179 which was earlier disconnected at relay switch 242a). Relay switch 256b disconnects solenoid 167 thereby allowing valve 165 to shift to its biased position and direct fluid to lower the side gate 32. Relay switch 256c is closed to establish a new connection to solenoid 212 causing valve 208 to shift and direct pressure fluid to the forward end of cylinder 70 thereby fully withdrawing the end ram 67. Relay switch 256d is closed to provide a holding circuit to maintain its relay 256 energized when the end gate 48 is returned upwardly to reopen limit switch 172.

As relay coil 238 is now deenergized its relay switch 238a is reopened killing the circuits to lamp 233 and relay 236. The latter in turn causes relaxing of the circuits to initial condition. Solenoid 156 will remain energized through limit switch 171 until the end gate 48 reaches a fully up position. However, as the end ram 67 is withdrawn limit switch 215 will reopen deenergizing solenoid 168. The latter releases valve 166 to its biased position and thereby directs pressure fluid to lift the end gate 48.

The apparatus has now returned to its starting condition and is ready to be recycled by again closing the manual switches 231 and 232.

Obviously many modifications and variations of the invention as hereinbefore set forth may be made without departing from the spirit and scope thereof, and therefore only such limitations should be imposed as are indicated in the appended claims.

We claim:

1. An improved method for pressing a body of food material wherein said material is roughly of rectangular form having vertical, lateral and longitudinal dimensions, said method comprising; receiving a body of material in a pressing zone; reducing the size of said zone to compress the body of material in each of vertical, lateral and longitudinal directions; partially expanding said zone under the influence of the compressed body of material; further compressing the body of material in one of said dimensions; fully releasing the compression on said body of material; and finally removing said body from said zone.

2. An improved method for pressing a body of food material wherein said material is roughly of rectangular form having vertical, lateral and longitudinal dimensions, said method comprising: laterally receiving a body of material in a rectangular pressing zone having six sides; reducing the size of said zone to compress the body of material in each of vertical, lateral and longitudinal directions; partially expanding said zone in one of said vertical and lateral dimensions by the reaction of the compressed body of material; further compressing the body of material in said longitudinal dimension; fully releasing the compression on said body of material; and finally, longitudinally removing said body from said zone.

3. An improved method for pressing a body of food material wherein said material is roughly of rectangular form having vertical, lateral and longitudinal dimensions, said method comprising: inserting said body of material in a lateral direction into a pressing zone; successively compressing the body of material in vertical, lateral and longitudinal directions; partially relieving at least one of said longitudinal, lateral and vertical compression to permit the body of material and said pressing zone to expand slightly; continuing the compression in one of the other said directions on said body of material; terminating all compression and expanding said pressing zone; opening a longitudinal end of said zone; and ejecting the body of material longitudinally through the open end of said zone.

4. An improved method for pressing a slab of bacon wherein said slab is of roughly rectangular form having vertical, lateral and longitudinal dimensions, said method comprising: inserting said slab in a first lateral direction into a pressing zone, said zone having six rectangular sides; confining said slab in said zone by closing all said six sides about said slab; vertically compressing by forcing a side downwardly on said slab; laterally compressing by forcing a side in a second lateral direction against said slab; longitudinally compressing by forcing a side in a first longitudinal direction against said slab; partially relieving at least one of said longitudinal, lateral and vertical compressions to permit the slab and said pressing zone to expand slightly; continuing the compression in one of the other of said directions on said slab; terminating all compressing and expanding said pressing zone; opening a longitudinal end of said zone, said end being in the direction of said first longitudinal direction; and ejecting the slab in said first longitudinal direction through said open end.

5. The method of claim 4 wherein the vertical compression is partially relieved and the longitudinal compression is thereafter continued; and subsequently opening a lateral side and inserting another slab into said pressing zone immediately following the ejection of a compressed slab.

References Cited by the Examiner

UNITED STATES PATENTS

| | | | |
|---|---|---|---|
| 1,257,558 | 2/1918 | Webb | 100—42 |
| 1,257,559 | 2/1918 | Webb | 100—42 |
| 2,043,366 | 6/1936 | Bech | 100—232 |
| 2,072,694 | 3/1937 | Walter | 100—232 |
| 2,229,862 | 1/1941 | Menges | 100—232 |
| 2,241,807 | 5/1941 | Cotner. | |
| 2,250,649 | 7/1941 | Pierson | 100—232 |
| 2,295,287 | 9/1942 | Muench | 100—42 X |
| 2,307,333 | 1/1943 | Pierson | 100—232 |
| 2,850,966 | 9/1958 | Dohm | 100—232 |
| 2,880,668 | 4/1959 | Cranke | 100—232 |
| 3,211,086 | 10/1965 | Pearce | 100—215 |

WALTER A. SCHEEL, *Primary Examiner.*

BILLY J. WILHITE, *Examiner.*